US011587110B2

(12) United States Patent
Landow et al.

(10) Patent No.: US 11,587,110 B2
(45) Date of Patent: Feb. 21, 2023

(54) SYSTEMS AND METHODS FOR GENERATING DIGITAL ITEMS

(71) Applicant: DISH Network L.L.C., Englewood, CO (US)

(72) Inventors: Kate Megan Carney Landow, Denver, CO (US); Joerg Nonnenmacher, American Fork, UT (US)

(73) Assignee: DISH NETWORK L.L.C., Englewood, CO (US)

( * ) Notice: Subject to any disclaimer, the term of this patent is extended or adjusted under 35 U.S.C. 154(b) by 270 days.

(21) Appl. No.: 16/509,329

(22) Filed: Jul. 11, 2019

(65) Prior Publication Data

US 2021/0012367 A1    Jan. 14, 2021

(51) Int. Cl.
*G06Q 30/0207*    (2023.01)
*G06Q 30/0251*    (2023.01)

(52) U.S. Cl.
CPC ..... *G06Q 30/0222* (2013.01); *G06Q 30/0253* (2013.01)

(58) Field of Classification Search
CPC .................. G06Q 30/0222; G06Q 30/0253
See application file for complete search history.

(56) References Cited

U.S. PATENT DOCUMENTS

| | | | |
|---|---|---|---|
| 4,949,256 A * | 8/1990 | Humble | G06Q 20/20 235/487 |
| 7,577,978 B1 | 8/2009 | Wistendahl et al. | |
| 8,312,486 B1 | 11/2012 | Briggs et al. | |
| 8,359,399 B2 | 1/2013 | Landow et al. | |
| 8,424,037 B2 | 4/2013 | Landow et al. | |
| 8,849,945 B1 | 9/2014 | Desjardins et al. | |
| 8,997,155 B2 | 3/2015 | Landow et al. | |
| 9,009,339 B2 | 4/2015 | Landow et al. | |
| 9,544,660 B2 | 1/2017 | Landow et al. | |
| 9,571,872 B2 | 2/2017 | Landow | |
| 10,091,556 B1 | 10/2018 | Liden et al. | |
| 2002/0010923 A1 | 1/2002 | Pack et al. | |
| 2002/0120934 A1 | 8/2002 | Abrahams | |
| 2002/0133817 A1 | 9/2002 | Markel | |
| 2002/0178020 A1 | 11/2002 | Simon et al. | |
| 2003/0171096 A1 | 9/2003 | Ilan et al. | |
| 2008/0196060 A1 | 8/2008 | Varghese | |
| 2011/0138334 A1 | 6/2011 | Jung | |
| 2011/0289535 A1 | 11/2011 | Saffari et al. | |
| 2012/0304225 A1 | 11/2012 | Ritter | |

(Continued)

*Primary Examiner* — Alexandru Cirnu
(74) *Attorney, Agent, or Firm* — Jeremiah J. Baunach; VLP Law Group LLP

(57) ABSTRACT

A television service provider system includes interactive elements embedded within advertisements or other content related to a particular product or service that a user may select to receive an initially non-redeemable coupon for the product. The system then electronically communicates to the seller or advertiser system the indications of such electronic interactivity between the viewers of content and content related to the product being sold or advertised. The advertiser or seller may then electronically activate and thus convert the non-redeemable coupon into a redeemable coupon. A system for processing retail transactions redeems the coupons for the product for a particular user using an identifier of the user associated with the account of the user with the television service provider.

17 Claims, 7 Drawing Sheets

(56) References Cited

U.S. PATENT DOCUMENTS

| | | |
|---|---|---|
| 2013/0174191 A1 | 7/2013 | Thompson, Jr. et al. |
| 2013/0326570 A1 | 12/2013 | Cowper et al. |
| 2014/0085542 A1 | 3/2014 | Seifeddine et al. |
| 2014/0282638 A1 | 9/2014 | Pequignot |
| 2015/0281793 A1 | 10/2015 | Wheatley et al. |
| 2016/0345076 A1 | 11/2016 | Makhlouf |
| 2018/0302682 A1 | 10/2018 | Saxena et al. |
| 2018/0315066 A1* | 11/2018 | Heitmueller ......... G06Q 20/387 |
| 2019/0090025 A1 | 3/2019 | Chesson |
| 2020/0128286 A1 | 4/2020 | Anders et al. |

\* cited by examiner

SYSTEMS AND METHODS FOR GENERATING DIGITAL ITEMS

TECHNICAL FIELD

The technical field relates to generating coupons, and particularly to generating coupons based on electronic interactivity.

BRIEF SUMMARY

A television service provider may provide an initially non-redeemable coupon in digital format for a product to a viewer of content in response to the viewer selecting an interactive element included in an advertisement for the product. The television service provider may then electronically communicate to the seller or advertiser system the indications of such electronic interactivity between the viewers of content and content related to the product being sold or advertised. The advertiser or seller may then electronically activate and thus convert the non-redeemable coupon into a redeemable coupon. This may be performed by the advertiser or seller system communicating an identifier of the redeemable coupon to the television service provider or directly to the user. The identifier of the redeemable coupon, for example, may be in the form of a machine readable barcode or other code or number that automatically appears on the coupon on the user's mobile device (along with a notification that the coupon is now active). In some embodiments, the television service provider system may wait until a threshold number of coupons have been issued by the television service provider associated with a particular advertisement or for a particular product and then communicate to the seller a total number of coupons issued (or unique interactions performed) in an aggregated batch operation such that the seller may make a decision to convert such coupons into redeemable coupons based on the total number of user interactions for the particular product or advertisement.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
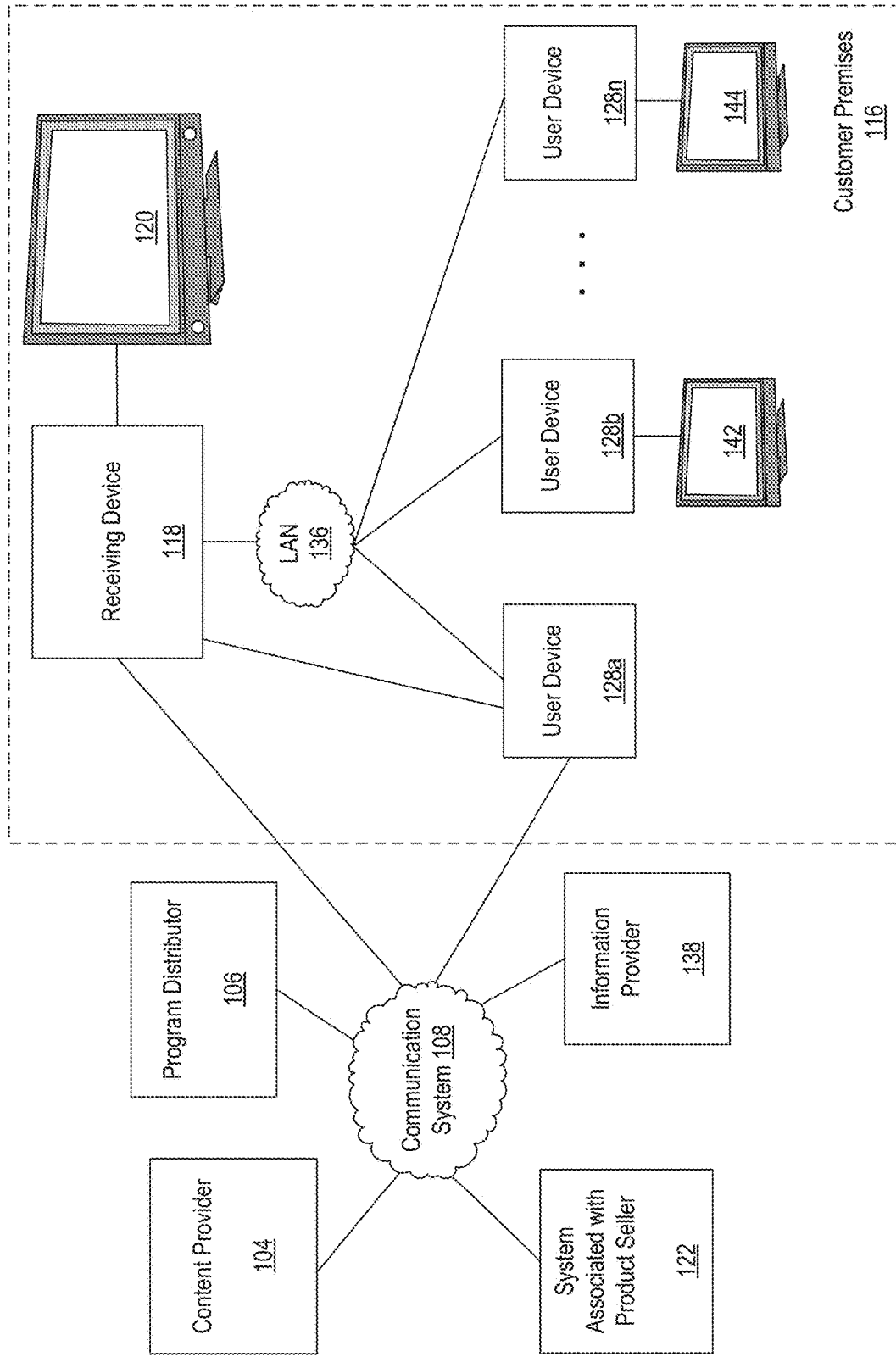
FIG. 1 is an overview block diagram illustrating a technical environment in which embodiments of generating coupons may be implemented, according to an example embodiment.

Advertisers are continually looking for ways to not only increase the consumption of products and services they advertise, but also to more accurately measure the effectiveness of their advertising. Advertising in the realm of digital media makes such problems technical in nature, which require technical solutions. For example, digital content, whether it is delivered to the consumer over the Internet (e.g., web-based content) or over broadcast satellite and cable mediums, may contain or have interactive elements added to them by a television service provider, such as a satellite or cable television service provider. Such interactive elements may be added by the program distributor systems of the television service provider prior to the content reaching the receiving device of the user or by the receiving device of the user. The interactive elements may include links or triggers to additional content, information, games, applications or programs. The television service provider may include such interactive elements embedded within advertisements or other content related to a particular product or service (herein the term "product" represents both products and services). Such advertisements or other content related to a product may be automatically detected by the television service provider by processing the content (e.g., using real-time and video processing object detection utilizing computer vision) in a manner to detect particular products, objects, activities, characteristics, language and/or words within the frames, scenes or audio of the content. However, in some embodiments, the content related to the product comprises an interactive element not linked to content provided by a broadcast television service provider, streaming media or other web-based content.

In some example embodiments, advertisements or other content related to a product may also or instead be automatically detected by the television service provider by capturing and processing metadata related to the product received with the content. A user interacting with (e.g., clicking on, touching or interacting verbally with) such interactive elements may be an indication at least that the user has seen the advertisement or content related to the product and may also be an indication that the user has some level of interest in the product. However, users will not typically interact with an interactive element if there is no perceived or apparent benefit or incentive for doing so. Thus, the television service provider may offer a coupon for the product being advertised in exchange for the user interacting with the interactive element. A coupon is a physical or digital promotional item provided to the user that may be shown, communicated or exchanged for the user to receive a discount or special deal on the purchase of the product. Some coupons may even be for a free product or service. Thus, a television service provider may offer such coupons as an incentive for a user to interact with such interactive elements embedded within advertisements or other content. Knowledge of such interactions and the volume of such interactions related to a specific advertisement and/or product are valuable to a seller of the product. Herein a "seller"

represents manufacturers, retail sellers and advertisers of the product. The volume of such interactions with a particular advertisement indicates the overall effectiveness or reach of the advertisement within which the interactive element was included. Also, each interaction for which a coupon was issued by the television service provider indicates that the user who interacted with the advertisement in order to obtain the coupon is a potential sales lead or potential consumer of the product advertised, which is not only an indicator of the effectiveness of the advertisement, but also an opportunity to sell more of the product.

However, since the seller is ultimately responsible for redeeming the coupon for the user to whom it was issued, the coupon provided by the television service provider is initially non-redeemable. In some embodiments, such a coupon may have an indication that it was issued by the television service provider or branded with the television service provider's logo or other mark) and is not yet redeemable. The television service provider may then electronically communicate to the seller system the non-redeemable coupon (which includes or represents an indication of the electronic interactivity between the user and content related to the product) such that the seller may electronically activate and thus convert the non-redeemable coupon into a redeemable coupon. This may be performed by the seller system communicating an identifier of the redeemable coupon to the television service provider or directly to the user. The identifier of the redeemable coupon, for example, may be in the form of a machine readable barcode or other code or number that automatically appears on the coupon on the user's mobile device (along with a notification that the coupon is now active). In some embodiments, the television service provider system may wait until a threshold number of coupons have been issued by the television service provider associated with a particular advertisement or for a particular product and then communicate to the seller a total number of coupons issued (or unique interactions performed) in an aggregated batch operation such that the seller may make a decision to convert such coupons into redeemable coupons based on the total number of user interactions for the particular product or advertisement.

The television service provider may also provide individual demographic and personal information pertaining to each user to whom a coupon was issued by the television service provider system and/or provide aggregate demographic information for the total number of users to whom coupons were issued. As privacy feature, the television service provider may provide an opt-in or opt-out feature for each user to provide such information. For example, such demographic information may include, but is not limited to, information regarding: name, address, email, contact information, phone number, address history, social media account information, age, gender, familial status, income, credit score or credit ranking, net worth, occupation, work history, race, religion, citizenship, geographic area, types of products purchased, shopping history, content viewing habits, content viewing history, content recording history, favorite channels, web browsing history, etc.

FIG. 1 is an overview block diagram illustrating a technical environment in which embodiments of generating coupons may be implemented, according to an example embodiment.

Before providing additional details regarding the operation and constitution of methods and systems for generating coupons, the example technical environment 102, within which such a system may operate, will briefly be described.

In the technical environment 102, audio, video, and/or data service providers, such as television service providers, provide their customers a multitude of video and/or data programming (herein, collectively "programming" or "content"). Such programming is often provided by use of a receiving device 118 communicatively coupled to a presentation device 120 configured to receive the programming. The programming may include any type of media content, including, but not limited to: television shows, news, movies, sporting events, advertisements, etc. In various embodiments any of this programming may be provided as a type of programming referred to as streaming media content, which is generally digital multimedia data that is substantially constantly received by and presented to an end-user or presented on a device while being delivered by a provider from a stored file source. Its verb form, "to stream," refers to the process of delivering media in this manner. The term refers to how the media is delivered rather than the media itself.

The receiving device 118 interconnects to one or more communications media or sources. For example, the various media content may be delivered as data using the IP suite over a packet-switched network such as the Internet or other packet-switched network. The underlying connection carrying such data may be via a cable head-end, satellite antenna, telephone company switch, cellular telephone system, Ethernet portal, off-air antenna, or the like. For example, the underlying connection carrying such data may be a fifth generation (5G) cellular network technology connection using "5G NR" (5G New Radio) software. For example, a 5G connection may be a connection that meets the requirements of the ITU IMT-2020 specification. The receiving device 118 may receive a plurality of programming by way of the communications media or sources, or may only receive programming via a particular channel or source described in greater detail below. In some embodiments, based upon selection by a user, the receiving device 118 processes and communicates the selected programming to the presentation device 120. Also, in some embodiments, the presentation device 120 may also be a receiving device 118 or have a receiving device 118 integrated within it.

Examples of a receiving device 118 may include, but are not limited to devices such as, or any combination of: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," "gaming console" and/or "television tuner," etc. Accordingly, the receiving device 118 may be any suitable converter device or electronic equipment that is operable to receive programming via a connection to a satellite or cable television service provider outside the customer premises and communicate that programming to another device over a network. Further, the receiving device 118 may itself include user interface devices, such as buttons or switches. In some example embodiments, the receiving device 118 may be configured to receive and decrypt content according to various digital rights management (DRM) and other access control technologies and architectures as part of the process of generating coupons, which will be described in further detail below.

Examples of a presentation device 120 may include, but are not limited to, one or a combination of the following: a television ("TV"), a personal computer ("PC"), a sound system receiver, a digital video recorder ("DVR"), a compact disk ("CD") device, DVD Player, game system, tablet device, smart phone, mobile device or other computing device or media player, and the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

In the example embodiment shown in FIG. 1, a plurality of user devices 128a, 128b, 128n may be communicatively connected to the television receiving device via a home LAN 136 or communication system 108 and/or directly, such as via a peer-to-peer short range wireless connection. For example, user device 128a may be a mobile device of a user, such as a smartphone, tablet device or other computing device. The LAN 136 generally covers only part or all of the customer premises 116. There may be fewer or additional user devices in various embodiments. One or more of the user devices 128a, 128b, 128n may communicate over the LAN 136 or communication system 108 with the television receiving device 118, program distributor 106, content provider 104, system associated with the product seller 122 and/or information provider using the transmission control protocol/Internet protocol (TCP/IP) suite of networking communication protocols. In various embodiments, all or part of the LAN 136 may be wired or wireless. One or more of the user devices 128a, 128b, 128n may be able to receive from the receiving device 118, over LAN 136, and play on their respective connected presentation devices 140, 142, 144, the live broadcast, recorded, streaming and/or on-demand programming initially received by the receiving device 118 from the cable or satellite television service provider. In some embodiments, one or more of the user devices 128a, 128b, 128n may be able to receive and play on their respective connected presentation devices 140, 142, 144, live broadcast, recorded, streaming and/or on-demand programming received directly from the cable or satellite television service provider via communication system 108, and in such a case, such a user device is also a receiving device. For example, user device 128a may be able to receive and play on an integrated presentation device, live broadcast, recorded, streaming and/or on-demand programming received directly from the cable or satellite television service provider via communication system 108. In the present example, the cable or satellite television service provider may encompass or be in communication with some or all of the content provider 104, program distributor 106, system associated with a product seller 122, and/or information provider 138.

In particular, a content provider 104 provides program content, such as television content, to a distributor, such as the program distributor 106. Example program distributors include, but are not limited to, satellite and cable television service providers. Example content providers include television stations which provide local or national television programming and special content providers which provide premium based programming, streaming services, pay-per-view programming and on-demand programming.

Program content (i.e., a program including or not including advertisements), is communicated to the program distributor 106 from the content provider 104 through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of: the Internet, cable systems, fiber optic systems, microwave systems, asynchronous transfer mode ("ATM") systems, frame relay systems, digital subscriber line ("DSL") systems, radio frequency ("RF") systems, telephone systems, cellular systems (including, but not limited to, 5G connections), and satellite systems.

In at least one embodiment, the received program content is converted by the program distributor 106 into a suitable signal (a "program signal") that is ultimately communicated to the receiving device 118 and/or user device 128a. Various embodiments of the receiving device 118 may receive programming from program distributors 106 and/or directly from content providers 104 via locally broadcast RF signals, cable, fiber optic, Internet media, or the like via the communication system 108.

For example, Video on Demand (VOD) systems may allow a user of the receiving device 118 to select, watch and/or listen to video and audio content on demand. For example "Internet Television" and "Internet Protocol Television" (IPTV) are systems through which various media content is delivered using the Internet IP suite over a packet-switched network such as the Internet represented by communication system 108 to the receiving device 118, instead of being delivered through traditional channels using terrestrial, satellite signal, and cable television formats of the communication system 108. In various example embodiments, such technologies are deployed within the environment 102 such as in subscriber-based telecommunications networks of the communication system 108 with high-speed access channels into the customer premises 116 via the receiving device 118 (e.g., a set-top box or other customer-premises equipment) to bring VOD services to the customer premises 116.

In various example embodiments, television VOD systems stream media content via the communications system 108 from files stored at a content storage system of a content delivery network operably coupled to the communication system 108, under direct or indirect control of the program distributor 106, to the receiving device 118. Television VOD systems may stream content to a receiving device 118 such as a set-top box, DVD player, game system, smart phone, television (including a smart TV), PC, a sound system receiver, a digital video recorder ("DVR"), a compact disk ("CD") device, tablet device, mobile device or other computing device or media player, and the like, allowing viewing in real time at the customer premises 116, or download it to a receiving device 118 such as a computer, DVR (also called a personal video recorder) or portable media player for viewing at any time. The receiving device 118 may in turn provide each of the user devices 128a, 128b, 128n access to such content from the receiving device 118 over the home LAN 136, such that each user device 128a, 128b, 128n may play the content on their respective connected presentation devices 140, 142, 144. In some embodiments, the presentation device may be integrated as part of the user device. Also, in some embodiments, a user device may communicate with the receiving device 118 to receive such content remotely via the Internet or otherwise via communication system 108. The program distributor 106 may offer VOD streaming, including pay-per-view and free content, whereby a user buys or selects a movie or television program and it begins to play on the presentation device 120 or on other presentation devices 140, 142, 144 via their respective user devices 128a, 128b, 128n almost instantaneously; downloading of the media content to a DVR rented from the program distributor; and/or downloading the content onto a computer or mobile device, for viewing in the future.

In some embodiments, the receiving device 118 may be a set-top box that is typically provided by the cable provider, satellite provider, or other program distributor 106 to which the customer may subscribe to receive such on-demand services and that also receives programming through traditional channels using a terrestrial, satellite signal, and/or cable television format. The various user devices 128a, 128b, 128n in communication with the receiving device 118 may also be devices provided by the program distributor, such as a cable provider or satellite provider. However, in some instances, such user devices may be devices other than those provided by the program distributor. For example, these may include various user devices such as a television, a digital video recorder (DVR), digital versatile disc (DVD) player, personal computer (PC), tablet device, game machine, smart phone, mobile device or other computing device or media player not provided by or controlled by the cable provider, satellite provider, or other program distributor to which the customer subscribes for the on-demand services.

The system associated with the product seller 122 is operably coupled to the communication system 108 and may be a system of an entity that provides or initiates providing of physical, electronic or digital coupons for a product related to the content provided by the content provider 104 and/or program distributor 106. For example, such entities may include, but are not limited to: product advertisers, product marketers, product manufacturers, service providers, product retailers (e.g., online or physical "brick and mortar" establishments), coupon companies or contractors associated with such entities authorized to issue coupons. In one embodiment, the system associated with the product seller 122 receives from the program distributor 106 and/or receiving device 118, over communication system 108, an indication of electronic interactivity between one or more users and content (e.g. an advertisement) related to a product of the product seller. The content related to the product is ultimately provided to the user and is provided by the content provider 104 and/or program distributor 106, but may be initially generated by a product seller (e.g., manufacturer, retailer or advertiser) (e.g., via the system associated with the product seller 122), content provider 104 or program distributor 104. In one example, the indication of electronic interactivity may include an indication that the user interacted with an interactive element (e.g., selected a link), embedded or otherwise provided by the program distributor 106 or receiving device 118 in the advertisement, to receive a coupon for the product advertised. The indication may also include an identifier of the content provider 104, program distributor 106 and/or receiving device 118 that embedded or otherwise provided the interactive element in the content related to the product. The system associated with the product seller 122 then sends to the program distributor 106, receiving device 118 and/or user device 128a, over communication system 108, an identifier of a redeemable coupon for the product, which enables redemption of the redeemable coupon. The environment 102 may include many systems associated with different product sellers that operate in a manner such as the system associated with the product seller 122 described herein and the system associated with the product seller 122 represents one or more of such systems in various embodiments.

In addition, information provider 138 may provide various forms of content and/or services to various devices residing in the customer premises 116. For example, information provider 138 may also provide information to the receiving device 118 regarding insertion of advertisements, interactive elements or other additional content or metadata into a media content segment provided to the receiving device 118. In some embodiments, such advertisements, interactive elements or other additional content or metadata may be provided by an advertisement server to the content provider 104, directly to the receiving device 118, or be inserted into the streaming media stored on a content storage system of a content delivery network coupled to the communication system or inserted (e.g., by the receiving device 118 or program distributor 106) before during or after it is streamed or broadcast to the receiving device 118 by the content provider 104 or program distributor 106. The information provider 138 may also, or instead, be another third party entity providing security data and/or services related to coupon generation, coupon redemption, coupon marketplaces, coupon clearinghouses, authentication, encryption, digital media rights, etc., on behalf of the program distributor 106, the system associated with the product seller 122 or other authorized entity. For example, the information provider 138 may provide location services and/or information that enables an advertiser to use such location services, via the system associated with the product seller 122, to facilitate the coupon increasing in value, In one embodiment, using such location services, the system associated with the product seller 122 and/or the user device 128a, may detect the user is currently in proximity to a particular retail establishment based on location services associated with the user device 128a and then increase (or offer to increase) the value of the coupon if the user uses the coupon at the particular retail establishment.

Encryption and decryption may be performed to secure the coupon data (e.g., identifiers of redeemable coupons) communicated via communication system 108 as applicable according to one or more of any number of currently available or subsequently developed encryption methods, processes, standards and/or algorithms including, but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the environment 102, the customer premises 116, and the various devices therein, is intended as a broad, non-limiting overview of an example environment in which various embodiments of generating coupons may be implemented. FIG. 1 illustrates just one example of an environment 102 and the various embodiments discussed herein are not limited to such environments. In particular, environment 102 and the various devices therein, may contain other devices, systems and/or media not specifically described herein. The environment 102 may include many different content providers, program distributors and information providers that operate in a corresponding manner as the content provider 104, program distributor 106 and information provider 138 as described herein. Each of the content provider 104, program distributor 106 and information provider 138 may represent one or more of such systems in various embodiments.

Example embodiments described herein provide applications, tools, data structures and other support to implement generating coupons. Other embodiments of the described techniques may be used for other purposes, including generating coupons to be communicated to and/or presented on various other devices, such as audio and DVD players, digital recorders, computers, peripherals, televisions, mobile devices, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
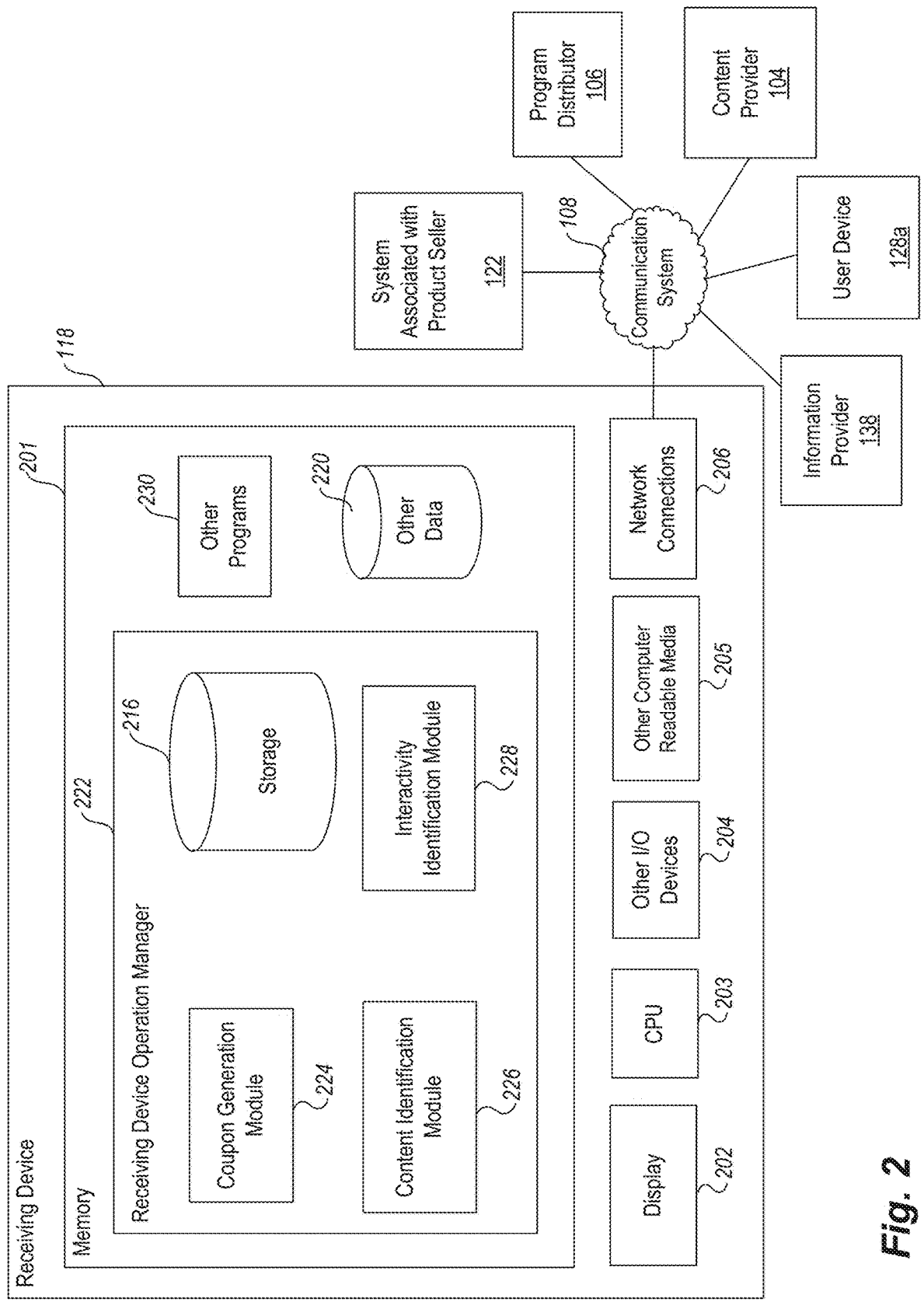
FIG. 2 is a block diagram illustrating elements of an example receiving device used in generating coupons, according to an example embodiment.

FIG. 2 is a block diagram illustrating elements of an example receiving device 118 used in generating coupons, according to an example embodiment.

In one embodiment, the receiving device 118 is a device such as a set-top box, television, DVR, DVD player, PC, tablet device, game machine, smart phone, mobile device or other computing device or media player configured to receive programming via a connection to a satellite or cable television service provider outside the customer premises and to display such programming on a presentation device. For example, the receiving device 118 may be configured to receive, process and display on a presentation device streaming media content received directly from the satellite or cable television service provider and/or other programming received directly from the satellite or cable television service provider such as cable or satellite television broadcasts via various other physical and logical channels of communication.

Note that one or more general purpose or special purpose computing systems/devices may be used to operate the receiving device 118; and perform, or cause a system to perform the following operations: receive data indicative of electronic interactivity between a user and content related to a product; in response to receiving the data indicative of the electronic interactivity between the user and the content related to the product, generate an initially non-redeemable coupon related to the product; electronically communicate the non-redeemable coupon to the user; electronically communicate to a system associated with a seller of the product 122 an indication of the electronic interactivity between the user and content related to the product; in response to the electronically communicating, to the system associated with the seller of the product, the indication of the electronic interactivity between the user and content related to the product, receive an identifier of a redeemable coupon for the product configured to enable redemption of the redeemable coupon; and electronically communicate the redeemable coupon to the user including the identifier of the redeemable coupon (the identifier of the redeemable coupon converting the non-redeemable coupon related to the product into the redeemable coupon); and communicate with the system associated with the product seller 122, content provider 104, program distributor 106, and/or information provider 138. In addition, in some embodiments, the receiving device 118 may comprise one or more distinct computing systems/devices and may span distributed locations. Furthermore, each block shown may represent one or more such blocks as appropriate to a specific embodiment or may be combined with other blocks. Also, each block shown may represent one or more such blocks in a computing device of the system associated with the product seller 122, content provider 104, program distributor 106, and/or information provider 138, as appropriate, to perform such function by that corresponding device of the system associated with the product seller 122, content provider 104, program distributor 106, and/or information provider 138. Additionally, the receiving device operation manager 222 may be implemented in software, hardware, firmware, or in some combination to achieve the capabilities described herein.

In the embodiment shown, receiving device 118 comprises a computer memory ("memory") 201, a display 202 (including, but not limited to a light emitting diode (LED) panel, cathode ray tube (CRT) display, liquid crystal display (LCD), touch screen display, etc.), one or more Central Processing Units ("CPU") 203, Input/Output ("I/O") devices 204 (e.g., keyboard, mouse, RF or infrared receiver, universal serial bus (USB) ports, other communication ports, and the like), other computer-readable media 205, and network connections 206. The receiving device operation manager 222 is shown residing in memory 201. In other embodiments, some portion of the contents and some, or all, of the components of the receiving device operation manager 222 may be stored on and/or transmitted over the other computer-readable media 205.

The components of the receiving device 118 and operation manager 222 preferably execute on one or more CPUs 203 and perform or facilitate the receiving, decrypting, decoding, processing, selecting, recording, playback and displaying of programming, as well as improved technical solutions including identifying, via the content identification module 226 residing in memory 222, content, (e.g., an advertisement, television program, commercial, movie or other program) related to the product within the television program content. In response to the identifying the content related to the product within the television program content, the content identification module 226 may embed, insert, overlay or otherwise include an interactive element in the advertisement or other identified content with which the user may interact to obtain the initially non-redeemable coupon related to the product. The initially non-redeemable coupon related to the product may be generated by the coupon generation module 224 residing in memory 222. The generating the non-redeemable coupon related to the product may include generating the non-redeemable coupon related to the product based on the identified advertisement or other content related to the product within the television program content.

The components of the receiving device 118 and operation manager 222 preferably execute on one or more CPUs 203 and may also facilitate or perform improved technical solutions including the following operations: receive, via the interactivity identification module 228 residing in memory 22, data indicative of electronic interactivity between a user and content related to a product, such as when the user interacts with the interactive element included in the content; in response to receiving the data indicative of the electronic interactivity between the user and the content related to the product, generate, via the coupon generation module 224, an initially non-redeemable coupon related to the product; electronically communicate the non-redeemable coupon to the user (e.g., to the user device 128*a*); electronically communicate to a system associated with a seller of the product 122 an indication of the electronic interactivity between the user and content related to the product; in response to the electronically communicating, to the system associated with the seller of the product, the indication of the electronic interactivity between the user and content related to the product, receive an of a redeemable coupon identifier (e.g., from the system associated with the product seller 122) for the product configured to enable redemption of the redeemable coupon; and electronically communicate the redeemable coupon to the user (e.g., to the user device 128a) including the identifier of the redeemable coupon (the identifier of the redeemable coupon converting the non-redeemable coupon related to the product into the redeemable coupon); and communicate with the content provider 104, program distributor 106, and/or information provider 138.

The receiving device operation manager 222 may also facilitate on-demand media services (e.g., VOD services), on-demand program ordering, processing and DRM and key management and storage corresponding to processing received streaming media content and other programming. The receiving device operation manager 222 may operate as, be part of, or work in conjunction and/or cooperation with various on-demand service software applications stored in memory 201 and on various user devices. The receiving device operation manager 222 also facilitates communication with peripheral devices such as a remote control, via the I/O devices 204, and with the user devices 128a, 128b, 128n and remote systems (e.g., the system associated with the product seller 122, the program distributor 106, the content provider 104, and/or the information provider 138) via the network connections 206.

Recorded or buffered programming received as streaming media content or other types of programming may reside on the media content storage 216, either in decrypted or encrypted form as applicable for securely storing, processing and displaying of the received media content according to the applicable DRM associated with the particular programming. The media content storage 216 may also store various program metadata associated with the recorded or buffered programming stored in the media content storage 216, such as that including, but not limited to: interactivity of users and interactive elements within program content, particular products related to or appearing in program content, particular products related to or appearing in video frames or scenes within the content, advertisements, interactive elements, interactive elements related to particular products related to or appearing in program content, coupons, coupon identifiers, user identifiers, product seller or manufacturer identifiers, DRM data, tags, codes, identifiers, format indicators, timestamps, user identifications, authorization codes, digital signatures, etc.

Other code or programs 230 (e.g., further audio/video processing modules, a program guide manager module, a Web server, and the like), and potentially other data repositories, such as data repository 220 for storing other data (e.g., interactivity of users and interactive elements within program content, particular products related to or appearing in program content, particular products related to or appearing in video frames or scenes within the content, advertisements, interactive elements, interactive elements related to particular products related to or appearing in program content, coupons, coupon identifiers, user identifiers, product seller or manufacturer identifiers, DRM data, tags, codes, identifiers, format indicators, timestamps, user identifications, authorization codes, digital signatures, user profiles, preferences and configuration data, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the receiving device 118 and operation manager 222 include an application program interface ("API") that provides programmatic access to one or more functions of the receiving device 118 and operation manager 222. For example, such an API may provide a programmatic interface to one or more functions of the receiving device operation manager 222 that may be invoked by one of the other programs 230, a remote control (not shown), the program distributor 106, the content provider 104, information provider 138, system associated with the product seller 122 or some other module. In this manner, the API may facilitate the development of third-party software, such as various different on-demand service applications, user interfaces, plug-ins, adapters (e.g., for integrating functions of the receiving device operation manager 222 and information provider 138 into desktop applications and mobile device applications), and the like to facilitate generating coupons using the receiving device 118, the program distributor 106, the content provider 104, information provider 138, system associated with the product seller 122 or some other module.

In an example embodiment, components/modules of the receiving device 118 and operation manager 222 are implemented using standard programming techniques. For example, the receiving device operation manager 222 may be implemented as a "native" executable running on the CPU 203, along with one or more static or dynamic libraries. In other embodiments, the receiving device 118 and operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 118 to perform the functions of the receiving device operation manager 222. In one embodiment, instructions cause the CPU 203 or some other processor, such as an I/O controller/processor, to receive coupon identifiers, decryption keys, access codes, identifications codes, etc., from external devices, such as wirelessly from a user device, other external device, or other external system, such as the program distributor 106, the content provider 104, information provider 138, system associated with the product seller 122 or some other system.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by a receiving device operation manager 222 implementation. Also, other functions could be implemented and/or performed by each component/module, and in different orders, and by different components/modules, yet still achieve the functions of the receiving device 118 and operation manager 222.

In addition, programming interfaces to the data stored as part of the receiving device 118 and operation manager 222, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The media content storage 216 and other data 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the receiving device operation manager 222.

Furthermore, in some embodiments, some or all of the components of the receiving device 118 and operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 3:
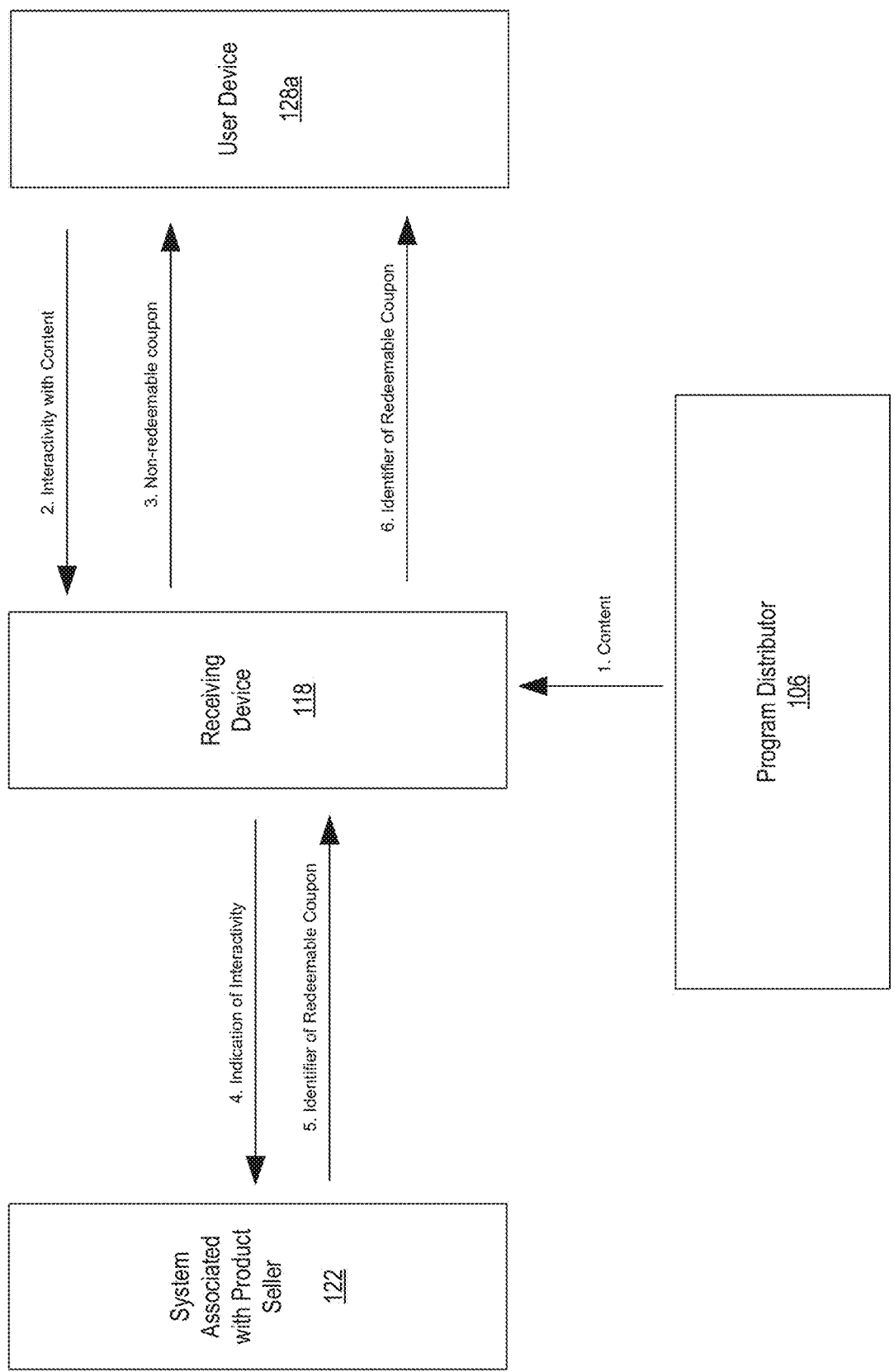
FIG. 3 is a block diagram of an example receiving device, system associated with a product seller, user device and program distributor, illustrating an order of example actions performed by such systems and entities when generating coupons, according to an example embodiment.

FIG. 3 is a block diagram of an example receiving device 118, system associated with a product seller 122, user device 118 and program distributor 106, illustrating an order of example actions performed by such systems and entities when generating coupons, according to an example embodiment.

The receiving device 118 receives media content from the program distributor 106, such as from a satellite or cable television service provider via communication system 108. The user utilizes the user device 128a (such as a remote control device or mobile device) to select or otherwise activate an interactive element embedded or otherwise placed in the received content. For example, such an interactive element may be inserted into the content by the receiving device 118. In other embodiments, such an interactive element may be already inserted into the content by the program distributor 106 or system associated with the product seller 122. In response to receiving the data indicative of the electronic interactivity between the user and the content related to the product, the receiving device generates an initially non-redeemable coupon related to the product. In other embodiments, such an initially non-redeemable coupon may generated by the program distributor 106, such as by a a remote system of the satellite or cable television service provider.

The receiving device 118 then electronically communicates the non-redeemable coupon to the user, such as by communicating the non-redeemable coupon in digital format to the user device 128a. The receiving device 118 (or program distributor 106) then electronically communicates to the system associated with the product seller 122 an indication of the electronic interactivity between the user and content related to the product. The system associated with the product seller 122 then electronically communicates an identifier of a redeemable coupon for the product to the receiving device 118 which then electronically communicates the identifier of the redeemable coupon for the product to the user device 128a, such that the user may redeem the coupon when purchasing the product. In some embodiments, the system associated with the product seller 122 electronically communicates the identifier of the redeemable coupon to the program distributor 106 (e.g., the satellite or cable television service provider) which then electronically communicates the identifier of the redeemable coupon to the user device 128a, or the system associated with the product seller 122 electronically communicates the identifier of the redeemable coupon directly to the user device 128a.

Figure 4:
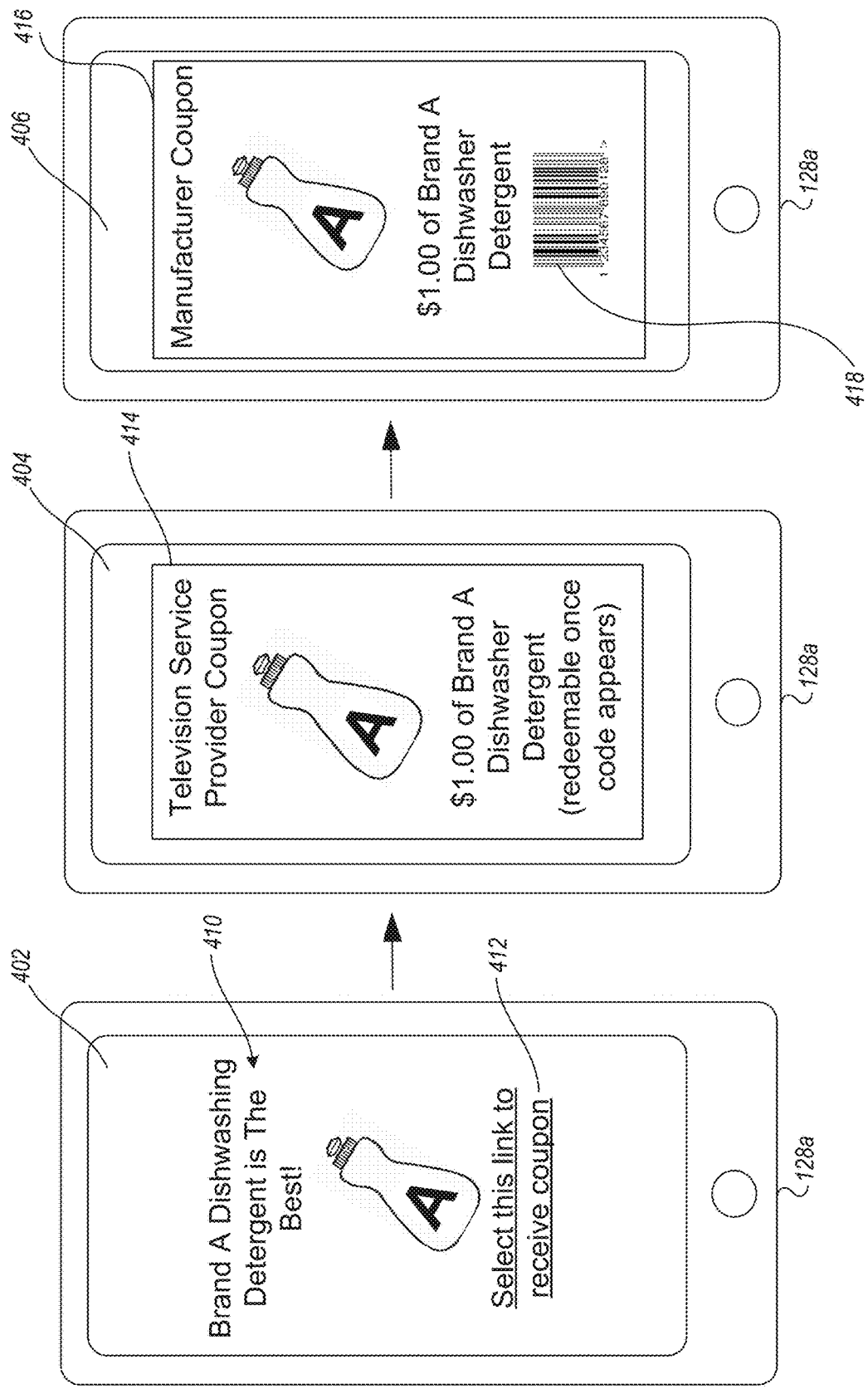
FIG. 4 is a diagram of an example user device showing three example user interface screen shown in an example coupon generation process, according to an example embodiment.

FIG. 4 is a diagram of an example user device 128a showing three example user interface screens 402, 404, 406 shown in an example coupon generation process, according to an example embodiment.

In example user interface screen 402, an advertisement 410 appears within content from a program distributor 106 being played on the user device 128a. This advertisement 410 includes an interactive element 412 selectable by the user to receive a coupon for the dishwashing detergent product being advertised. In response to the selection of the an interactive element 412, an initially non-redeemable coupon 414 appears on the second example user interface screen 404, which indicates that the coupon is redeemable once a coupon identifier (e.g., a coupon code) appears on the coupon 414. After the program distributor (e.g., the satellite or cable television service provider) communicates the selection of the interactive element 412 to the system associated with the product seller 122 and, in turn, receives the coupon identifier, the coupon identifier appears as a bar code 418 on the now redeemable coupon 416 shown in the third example user interface screen 406. In some embodiments, there may be one or more additional notifications (e.g., texts, emails, phones calls, pop-up notices, other messages, etc.) to the user that the coupon 416 is now redeemable. Such additional notifications may include the coupon and/or bar code 418 as well.

Figure 5:
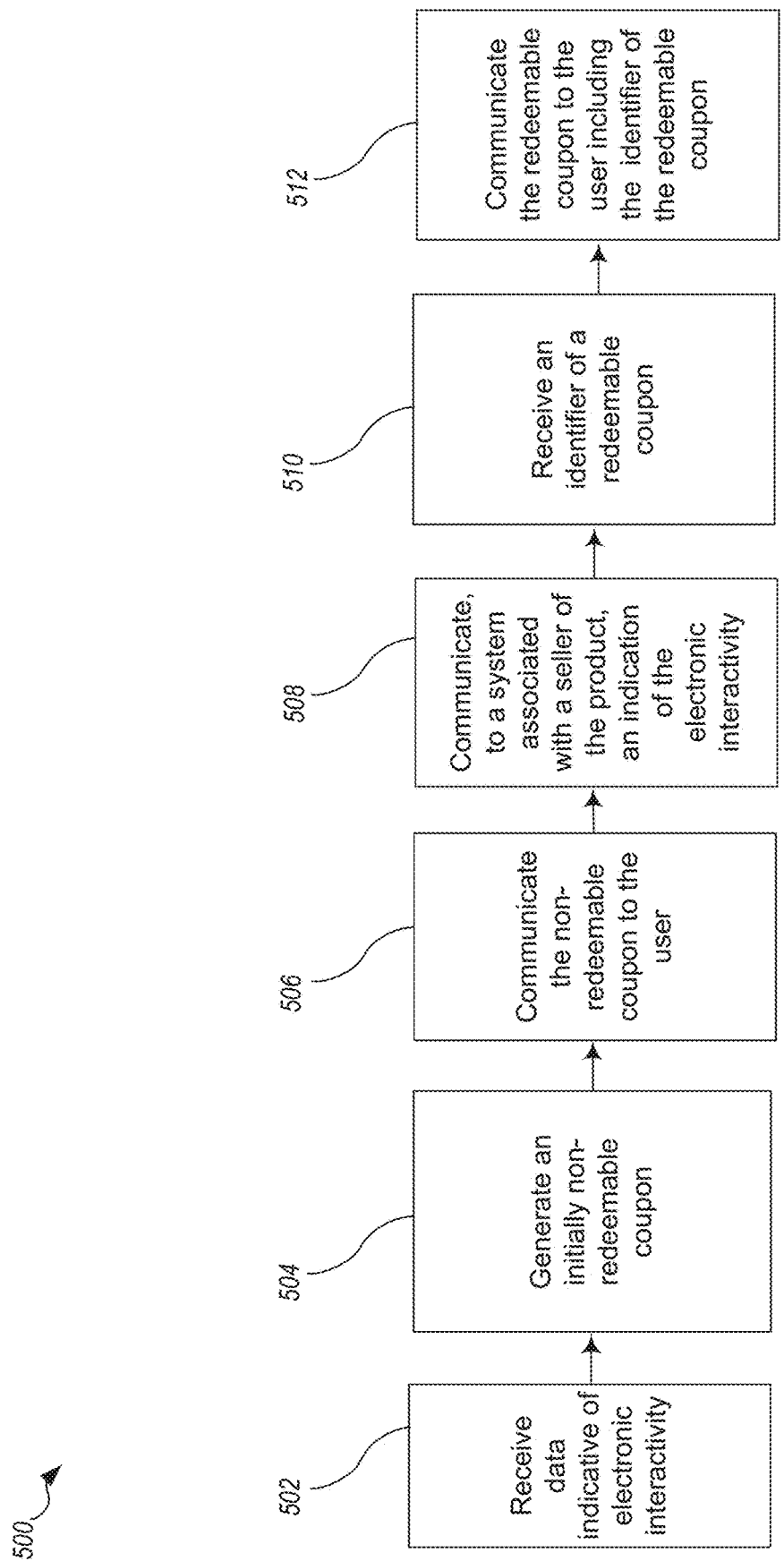
FIG. 5 is a flow diagram of an example method for generating coupons that may be performed from a perspective of a program distributor, according to one example embodiment.

FIG. 5 is a flow diagram of an example method 500 for generating coupons that may be performed from a perspective of a program distributor, according to one example embodiment.

At 502, the program distributor 106 or receiving device 118, receives data indicative of electronic interactivity between a user and content related to a product.

At 504, the program distributor 106 or receiving device 118, in response to receiving the data indicative of the electronic interactivity between the user and the content related to the product, generates an initially non-redeemable coupon related to the product.

At 506, the program distributor 106 or receiving device 118 electronically communicates the non-redeemable coupon to the user.

At 508, the program distributor 106 or receiving device 118 electronically communicates to a system associated with a seller of the product, an indication of the electronic interactivity between the user and content related to the product.

At 510, the program distributor 106 or receiving device 118, in response to the electronically communicating, to the system associated with the seller of the product, the indication of the electronic interactivity between the user and content related to the product, receives an identifier of a redeemable coupon for the product configured to enable redemption of the redeemable coupon.

At 510, the program distributor 106, receiving device 118 or the system associated with the product seller 122 electronically communicates the redeemable coupon to the user including the identifier of the redeemable coupon. The identifier of the redeemable coupon is configured to convert the non-redeemable coupon related to the product into the redeemable coupon.

Figure 6:
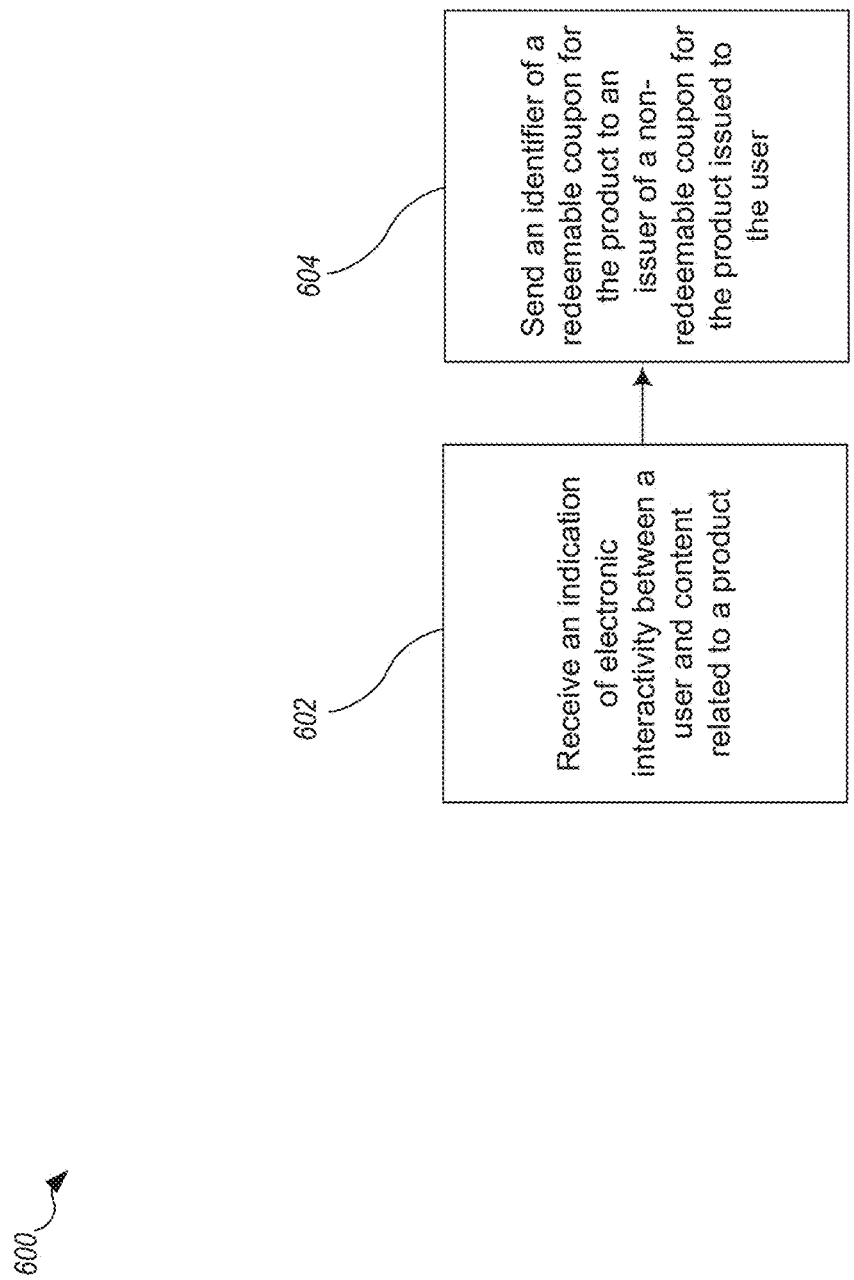
FIG. 6 is a flow diagram of an example method for generating coupons that may be performed from a perspective of a system associated with a product seller, according to one example embodiment.

FIG. 6 is a flow diagram of an example method 600 for generating coupons that may be performed from a perspective of a system associated with a product seller, according to one example embodiment.

At 602, the system associated with the product seller 122 electronically receives an indication of electronic interactivity between a user and content related to the product.

At 604, the system associated with the product seller 122, in response to the indication of the electronic interactivity between the user and content related to the product, electronically sends an identifier of a redeemable coupon for the product to an issuer of a non-redeemable coupon for the product that was issued to the user as a result of the interactivity (such as issued by the program distributor 106). This is to enable the non-redeemable coupon for the product issued to the user to be converted into the redeemable coupon.

Figure 7:
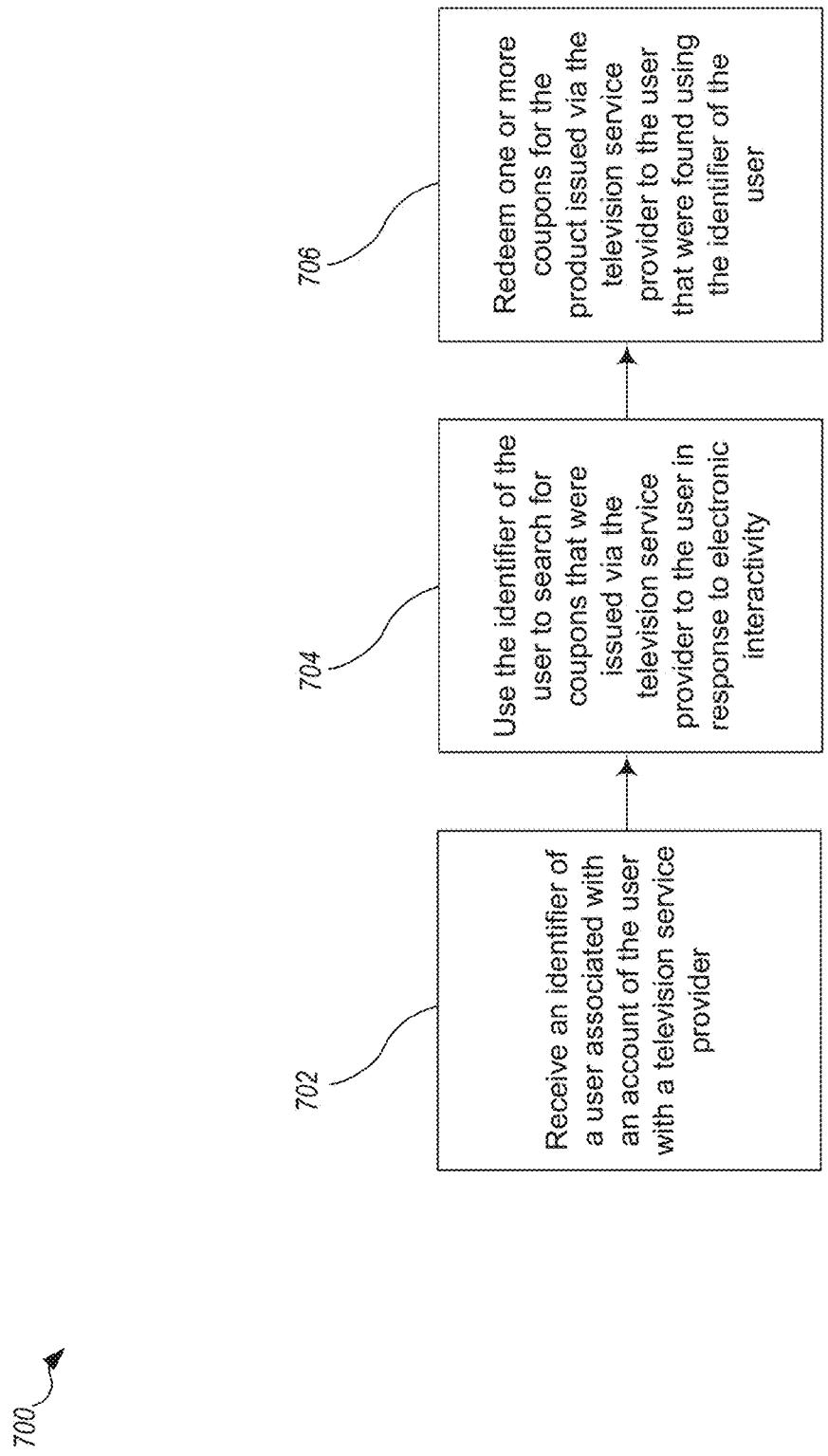
FIG. 7 is a flow diagram of an example method for redeeming coupons generated via a coupon generation process described herein, according to one example embodiment.

FIG. 7 is a flow diagram of an example method 700 for redeeming coupons generated via a coupon generation process described herein, according to one example embodiment.

At 702, a system for processing retail transactions receives an identifier of a user during a transaction to purchase a product by the user. The identifier of the user is associated with an account of the user with a program distributor 106 (e.g., a television service provider).

At 704, the system for processing retail transactions uses the identifier of the user associated with the account of the user with the program distributor 106 to search for coupons that were issued via the program distributor 106 to the user in response to electronic interactivity between the user and content provided by the program distributor 106. The content provided by the program distributor 106 may be detected by the program distributor 106 to be related to the product.

At 706, during the transaction, the system for processing retail transactions redeems one or more coupons for the product issued via the program distributor 106 to the user that were found using the identifier of the user associated with the account of the user with program distributor 106. The system for processing retail transactions, for example, may be the system associated with the product seller 122 or other system of a retailer or seller of the product (e.g., a cashier system).

The invention claimed is:

1. A method in a system for generating digital items, comprising:
    identifying, by the system for generating digital items, a visible item related to a physical or digital object within television program content;
    in response to the identifying the visible item related to the physical or digital object within the television program content, inserting an interactive element in the visible item with which a user may interact to obtain an initially inactivated digital item related to the physical or digital object;
    performing real-time video processing object detection to automatically detect one or more interactive elements, including the interactive element, embedded within digital content related to the physical or digital object;
    receiving, by the system for generating digital items, data indicative of electronic interactivity between the user and the content related to the physical or digital object based on the detected one or more interactive elements;
    in response to receiving the data indicative of the electronic interactivity between the user and the content related to the physical or digital object, generating, by the system for generating digital items, the initially inactivated electronic digital item related to the physical or digital object, wherein the generating the inactivated digital item related to the physical or digital object includes generating the inactivated digital item related to the physical or digital object based on the identified visible item related to the physical or digital object within the television program content;
    communicating, by the system for generating digital items, the inactivated electronic digital item to the user;
    electronically communicating, by the system for generating digital items, to a separate system associated with the physical or digital object, an indication of the electronic interactivity between the user and content related to the physical or digital object;
    in response to the electronically communicating, to the separate system, the indication of the electronic interactivity between the user and content related to the physical or digital object, receiving an identifier of an activated electronic digital item for the physical or digital object configured to enable use of the activated digital item; and
    communicating the activated digital item to the user including the identifier of the activated digital item, the identifier of the activated digital item converting the inactivated digital item related to the physical or digital object into the activated digital item.

2. The method of claim 1 wherein the system for generating digital items is a system of one or more of: a satellite television service provider, a cable television service provider, a television program distributor, a streaming video service provider, and a content provider.

3. The method of claim 1 wherein the physical or digital object is a physical or digital object or service.

4. The method of claim 1 wherein the receiving the data indicative of electronic interactivity between the user and the content related to the physical or digital object includes receiving an indication that the user has interacted with the interactive element in the visible item.

5. The method of claim 1 wherein the interactive element is an interactive notice that the user may electronically select to receive a digital item for the physical or digital object.

6. The method of claim 1 further comprising:
electronically receiving, by the system for generating digital items, data indicative of electronic interactivity between a plurality of users and content related to the physical or digital object;
in response to receiving the data indicative of the electronic interactivity between the plurality of users and the content related to the physical or digital object, generating, by the system for generating digital items, a plurality of inactivated digital items related to the physical or digital object;
for each user of the plurality of users, electronically communicating to the user, by the system for generating digital items, a corresponding inactivated digital item related to the physical or digital object of the plurality of inactivated digital items;
electronically communicating, by the system for generating digital items, to the separate system, data indicative of a total number of electronic interactivities between the plurality of users and the content related to the physical or digital object; and
in response to the electronically communicating the data indicative of the total number of electronic interactivities between the plurality of users and the content related to the physical or digital object, receiving a plurality of identifiers of activated digital items for the physical or digital object, each identifier of the plurality of identifiers of activated digital items for the physical or digital object corresponding to a different one of the electronic interactivities between the plurality of users and the content related to the physical or digital object; and
in response to receiving the plurality of identifiers of activated digital items for the physical or digital object, for each user of the plurality of users, communicating a activated digital item for the physical or digital object to the user including a corresponding identifier of the plurality of identifiers of activated digital items.

7. The method of claim 6 further comprising receiving, by the system for generating digital items, data indicative of compensation for the electronically communicating, to the separate system, the data indicative of the total number of electronic interactivities between the plurality of users and the content related to the physical or digital object.

8. The method of claim 6 further comprising:
electronically receiving, by the system for generating digital items, data indicative of a plurality of electronic interactivities between a specific user of the plurality of different users and different content related to corresponding different physical or digital objects;
in response to receiving the data indicative of the plurality of electronic interactivities between the specific user of the plurality of different users and different content related to corresponding different physical or digital objects, generating, by the system for generating digital items, a plurality of inactivated digital items related to the corresponding different physical or digital objects;
storing an association between an identifier of the specific user and the plurality of inactivated digital items related to the corresponding different physical or digital objects;
electronically communicating, by the system for generating digital items, to each system of a plurality of different separate systems associated with different physical or digital objects, an indication of a corresponding electronic interactivity of the plurality of electronic interactivities between the specific user and content related to a corresponding physical or digital object associated with the separate system;
in response to the electronically communicating to each system of the plurality of different separate systems the indication of the corresponding electronic interactivity, receiving a plurality of unique identifiers of activated digital items for the corresponding different physical or digital objects; and
storing an association between the identifier of the specific user and the plurality of unique identifiers of activated digital items for the corresponding different physical or digital objects, enabling the specific user to redeem the activated digital items for the corresponding different physical or digital objects via the identifier of the specific user.

9. The method of claim 8 wherein the system for generating digital items is a system of a broadcast television service provider and the identifier of the specific user is associated with an account of the user with the broadcast television service provider.

10. The method of claim 1 wherein the communicating the activated digital item to the user including the identifier of the activated digital item includes:
electronically receiving an indication that the user is geographically located within proximity to a retailer at which the activated digital item may be redeemed; and
in response to the electronically receiving the indication that the user is geographically located within proximity to the retailer at which the activated digital item may be redeemed, communicating the activated digital item to the user via a mobile device of the user including the identifier of the activated digital item.

11. The method of claim 1 wherein the inactivated digital item related to the physical or digital object is associated with a broadcast television service provider via which the user received the content.

12. The method of claim 11 wherein the association of the inactivated digital item related to the physical or digital object with the broadcast television service provider is communicated to the user during the electronic interactivity between the user and the content related to the physical or digital object.

13. The method of claim 1 wherein the content related to the physical or digital object comprises an interactive element not linked to content provided by a broadcast television service provider, streaming media or other web-based content.

14. The method of claim 1 wherein the content related to the physical or digital object is web-based content.

15. A system for generating digital items, comprising:
at least one processor; and
at least on memory coupled to the at least one processor, wherein the at least one processor is configured to:
identify a visible item related to a physical or digital object within television program content;
in response to the identifying the visible item related to the physical or digital object within the television program content, insert an interactive element in the visible item with which a user may interact to obtain an initially inactivated digital item related to the physical or digital object;

perform real-time video processing object detection to automatically detect one or more interactive elements, including the interactive element, embedded within digital content related to the physical or digital object;

generate an inactivated digital item related to the physical or digital object based on the identified visible item related to the physical or digital object within the television program content; electronically receive, by a system associated with a separate system associated with a physical or digital object, an indication of electronic interactivity between the user and content related to the physical or digital object; and in response to the indication of the electronic interactivity between the user and content related to the physical or digital object, electronically send an identifier of an activated digital item for the physical or digital object to an issuer of the inactivated digital item for the physical or digital object issued to the user as a result of the interactivity to enable the inactivated digital item for the physical or digital object issued to the user to be converted into the activated digital item.

16. The system of claim 15 wherein the at least one processor is further configured to:

electronically receive, by the separate system associated with the physical or digital object, an indication of electronic interactivity between a plurality of users and content related to the physical or digital object;

in response to the indication of the electronic interactivity between the plurality of users and content related to the physical or digital object, electronically send a plurality of identifiers of activated digital items for the physical or digital object to an issuer of inactivated digital items for the physical or digital object issued to the plurality of users as a result of the interactivity, to enable the inactivated digital items for the physical or digital object issued to the plurality of users to be converted into activated digital items;

determine an amount of the activated digital items redeemed based on how many of the plurality of identifiers were communicated during redemption;

determine an amount of users who viewed the content related to the physical or digital object based on the determined amount of the activated digital items redeemed; and determine a level of effectiveness of the content related to the physical or digital object based on the determined amount of users who viewed the content.

17. The system of claim 15 wherein the indication of electronic interactivity between the plurality of users and content related to the physical or digital object is received from a system of a broadcast television service provider and the at least one processor is further configured to electronically initiate compensation to the television service provider based on the electronic interactivity between the plurality of users and content related to the physical or digital object.

* * * * *